(12) United States Patent
Schemers et al.

(10) Patent No.: US 12,321,899 B2
(45) Date of Patent: Jun. 3, 2025

(54) AGGREGATING AN EVENT OCCURRENCE FEEDBACK REPORT WITHIN A GROUP-BASED COMMUNICATION SYSTEM

(71) Applicant: Salesforce, Inc., San Francisco, CA (US)

(72) Inventors: Roland Schemers, Woodside, CA (US); James McPhail, San Francisco, CA (US); Lydia Han, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/952,860

(22) Filed: Sep. 26, 2022

(65) Prior Publication Data

US 2023/0027998 A1    Jan. 26, 2023

Related U.S. Application Data

(63) Continuation of application No. 16/264,062, filed on Jan. 31, 2019, now Pat. No. 11,501,261.

(51) Int. Cl.
*G06Q 10/10* (2023.01)
*G06Q 10/1093* (2023.01)
*H04L 51/08* (2022.01)

(52) U.S. Cl.
CPC ......... *G06Q 10/1093* (2013.01); *H04L 51/08* (2013.01)

(58) Field of Classification Search
CPC ....................................................... G06Q 10/10
USPC .......................................................... 705/7.18
See application file for complete search history.

(56) References Cited

U.S. PATENT DOCUMENTS

| 2014/0152757 | A1* | 6/2014 | Malegaonkar | H04L 67/535 348/14.01 |
| 2014/0198173 | A1* | 7/2014 | Willig | H04N 7/155 348/14.06 |
| 2016/0117624 | A1* | 4/2016 | Flores | H04L 67/306 705/7.39 |
| 2018/0077099 | A1* | 3/2018 | Silva | H04L 51/04 |
| 2018/0287982 | A1 | 10/2018 | Draeger et al. | |
| 2019/0378076 | A1* | 12/2019 | O'Gorman | H04M 3/56 |

OTHER PUBLICATIONS

"Die, Email, Die! A Flickr Cofounder Aims To Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013) 2 pages.

(Continued)

*Primary Examiner* — Nga B Nguyen
(74) *Attorney, Agent, or Firm* — Holland & Hart LLP

(57) ABSTRACT

Systems and methods for generating an event occurrence feedback report after receipt of an event occurrence completion indicator, the event occurrence completion indicator associated with an event occurrence identifier and received from a third party event scheduling resource, and to present the event occurrence feedback report to a client device associated with an event occurrence creator identifier are provided herein.

20 Claims, 4 Drawing Sheets

(56) References Cited

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014) 8 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014) 4 pages.
Matsumoto, T. et al., "Chocoa Communicator—A New Communication System Based on Awareness and Text Communications—", Fujitsu Sci. Tech. J., 36, 2, (Dec. 2000) 154-161.
Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014), 2 pages.
Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516> (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

\* cited by examiner

AGGREGATING AN EVENT OCCURRENCE FEEDBACK REPORT WITHIN A GROUP-BASED COMMUNICATION SYSTEM

CROSS-REFERENCE TO RELATED APPLICATIONS

This application is a continuation application claiming priority benefit, with regard to all common subject matter, of U.S. patent application Ser. No. 16/264,062, filed Jan. 31, 2019, and entitled "AGGREGATING AN EVENT OCCURRENCE FEEDBACK REPORT WITHIN A GROUP-BASED COMMUNICATION SYSTEM," which is hereby incorporated by reference in its entirety.

BACKGROUND

Various messaging systems may support communication and event-driven collaboration among users across an enterprise. Applicant has identified a number of deficiencies and problems associated with such messaging systems. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods, apparatus, and computer program products for generating an event occurrence feedback report after receipt of an event occurrence completion indicator. In embodiments, the event occurrence completion indicator is associated with an event occurrence identifier and received from a third party event scheduling resource. In embodiments, the methods, apparatuses, and computer program products are also for presenting the event occurrence feedback report within a group-based communication interface.

In some embodiments, an apparatus comprises at least one processor, and at least one non-transitory memory comprising instructions that, with the at least one processor, cause the apparatus to perform functions described herein. In embodiments, the apparatus is caused to receive an event occurrence data structure comprising a plurality of event occurrence parameters. In embodiments, the apparatus is caused to, using a group-based communication system data corpus and based on one or more event occurrence parameters of the plurality of event occurrence parameters, determine one or more group-based communication channel identifiers with which the event occurrence data structure is associated.

In embodiments, the apparatus is caused to receive a plurality of group-based communication messages associated with the one or more group-based communication channel identifiers. In embodiments, each of the plurality of group-based communication messages having associated therewith a group-based communication message timestamp occurring subsequent an event occurrence timestamp and having a sending user identifier in common with one or more of one or more event occurrence invitee identifiers, one or more event occurrence invitation acceptance identifiers, one or more event occurrence invitation decline identifiers, and one or more event occurrence attendees identifiers associated with the event occurrence data structure.

In embodiments, the apparatus is caused to parse each group-based communication message of the plurality of group-based communication messages to detect one or more group-based communication conversation segments. In embodiments, each group-based communication conversation segment having associated therewith a conversation topic.

In embodiments, the apparatus is caused to, upon determining that the conversation topic is related to an event occurrence title, aggregate the one or more group-based communication conversation segments into an event occurrence feedback report associated with the event occurrence identifier.

In embodiments, the apparatus is caused to parse each group-based communication message of the plurality of group-based communication messages to detect one or more content creation occurrences. In embodiments, each content creation occurrences having associated therewith a content topic.

In embodiments, the apparatus is caused to, upon determining that the content topic is related to the event occurrence title, aggregate content associated with the one or more content creation occurrences into the event occurrence feedback report.

In embodiments, the apparatus is caused to retrieve historical event occurrence attendance data associated with each of the event occurrence invitee identifiers and, using an event occurrence attendance model, determine an event occurrence attendance score associated with the event occurrence identifier.

In embodiments, the apparatus is caused to aggregate the event occurrence attendance score into the event occurrence feedback report.

In embodiments, the apparatus is caused to transmit the event occurrence feedback report to a client device associated with an event occurrence creator identifier. In embodiments, the event occurrence feedback report is renderable for display by the client device.

In some embodiments, the one or more event occurrence parameters are one or more of an event occurrence identifier, an event occurrence timestamp, an event occurrence invitee identifier, an event occurrence invitation acceptance identifier, an event occurrence invitation decline identifier, an event occurrence attendee identifier, and an event occurrence title.

In some embodiments, parsing each group-based communication message of the plurality of group-based communication messages into one or more communication message segments uses a machine learning model that has been trained using a group-based communication message corpus.

In some embodiments, the group-based communication conversation segments to be aggregated into the event occurrence feedback report comprise the group-based communication conversation segments determined to be associated with one or more of the event occurrence identifier, the event occurrence timestamp, the one or more event occurrence invitee identifiers, the one or more event occurrence invitation acceptance identifiers, the one or more event occurrence invitation decline identifiers, or the one or more event occurrence attendee identifiers, or the event occurrence title.

In some embodiments, the content to be aggregated into the event occurrence feedback report comprises the content determined to be associated with one or more of the event occurrence identifier, the event occurrence timestamp, the one or more event occurrence invitee identifiers, the one or more event occurrence invitation acceptance identifiers, the one or more event occurrence invitation decline identifiers, the one or more event occurrence attendee identifiers, or the event occurrence title.

In some embodiments, the historical event occurrence attendance data associated with an event occurrence invitee identifier comprises an event occurrence invite status associated with an event occurrence invitee, an event occurrence acceptance or an event occurrence decline, and an event occurrence attendance.

In some embodiments, the historical event occurrence attendance data is retrieved from one of either a third party event scheduling resource or a group-based communication repository.

In some embodiments, the event occurrence attendance model is based on one or more of a plurality of historical event occurrence attendance data, event occurrence data structures having one or more common event occurrence parameters, and events occurrences that have already concluded and are associated with common event occurrence creator identifiers. In some embodiments, using the event occurrence attendance model comprises using a machine learning model that provides a prediction of a likelihood of an event occurrence invitee's attendance based on one or more of historical event occurrence attendance data, one or more common event occurrence parameters, and event occurrences that have already concluded and are associated with common event occurrence creator identifiers. In some embodiments, the event occurrence attendance model uses a machine learning model trained using historical event occurrence attendance data.

In some embodiments, the event occurrence attendance score is determined based a comparison of the historical event occurrence attendance data associated with each of the event occurrence invitee identifiers to predetermined benchmarks and suggested best practices associated with one or more common event occurrence parameters and events occurrences that have already concluded and are associated with common event occurrence creator identifiers, wherein the comparison defines relative overachievements and deficiencies of the historical event occurrence attendance data associated with each of the event occurrence invitee identifiers.

In some embodiments, each of the overachievements or deficiencies of the historical event occurrence attendance data associated with each of the event occurrence invitee identifiers is assigned a value and aggregated into the event occurrence attendance score.

In some embodiments, the event occurrence feedback report comprises at least the event occurrence timestamp, the event occurrence attendance score, the content associated with the one or more content creation occurrences, and the one or more group-based communication conversation segments. In some embodiments, the event occurrence feedback report is renderable for display within an event occurrence feedback report interface.

In some embodiments, the group-based communication system data corpus comprises group-based communication data work objects, group-based communication messages, group-based communication channels, and user profiles associated with a group-based communication system.

In some embodiments, wherein the event occurrence feedback report is renderable for display within a private group-based communication channel interface.

BRIEF DESCRIPTION OF THE DRAWINGS

Figure 1:
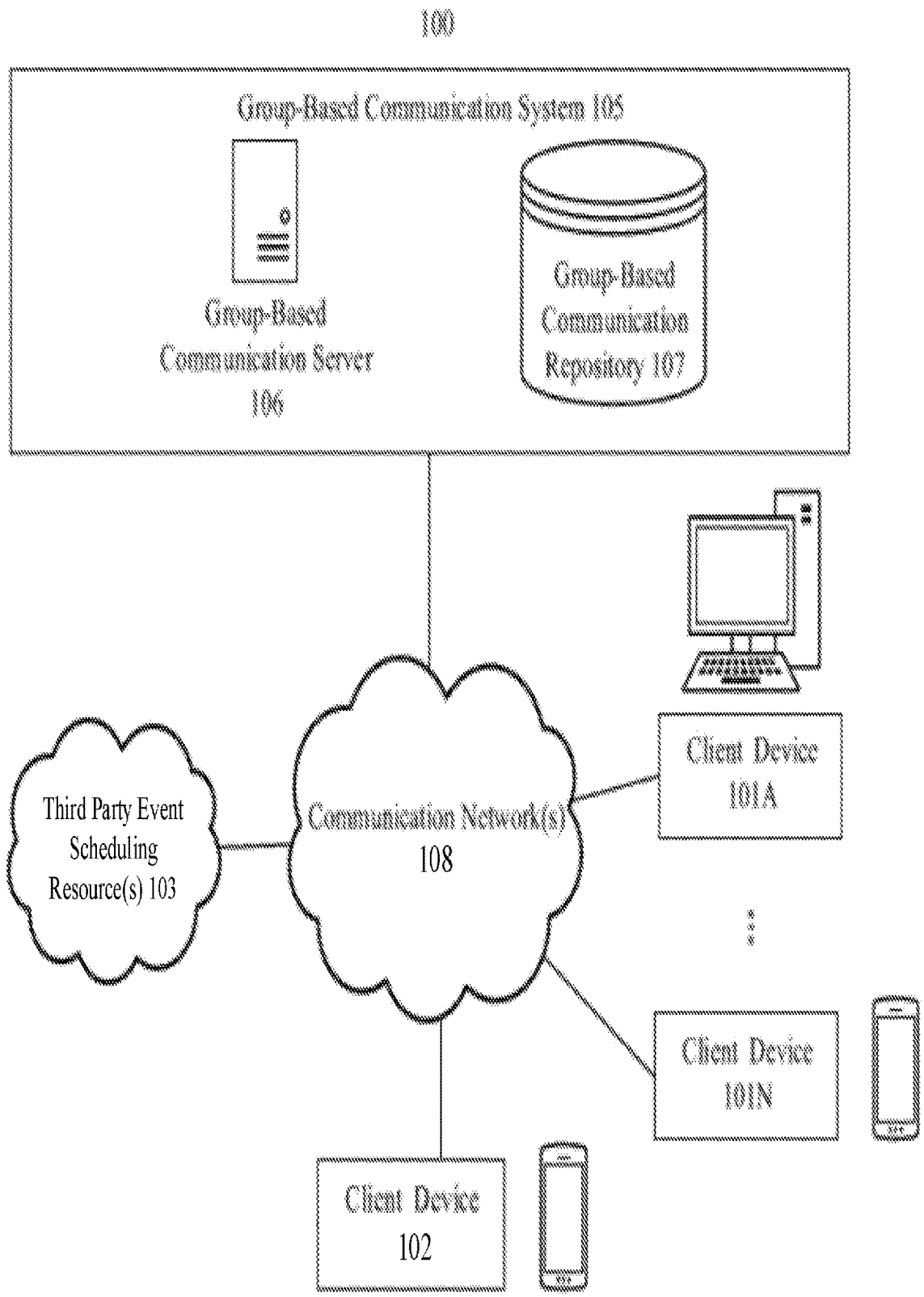
Figure 2:
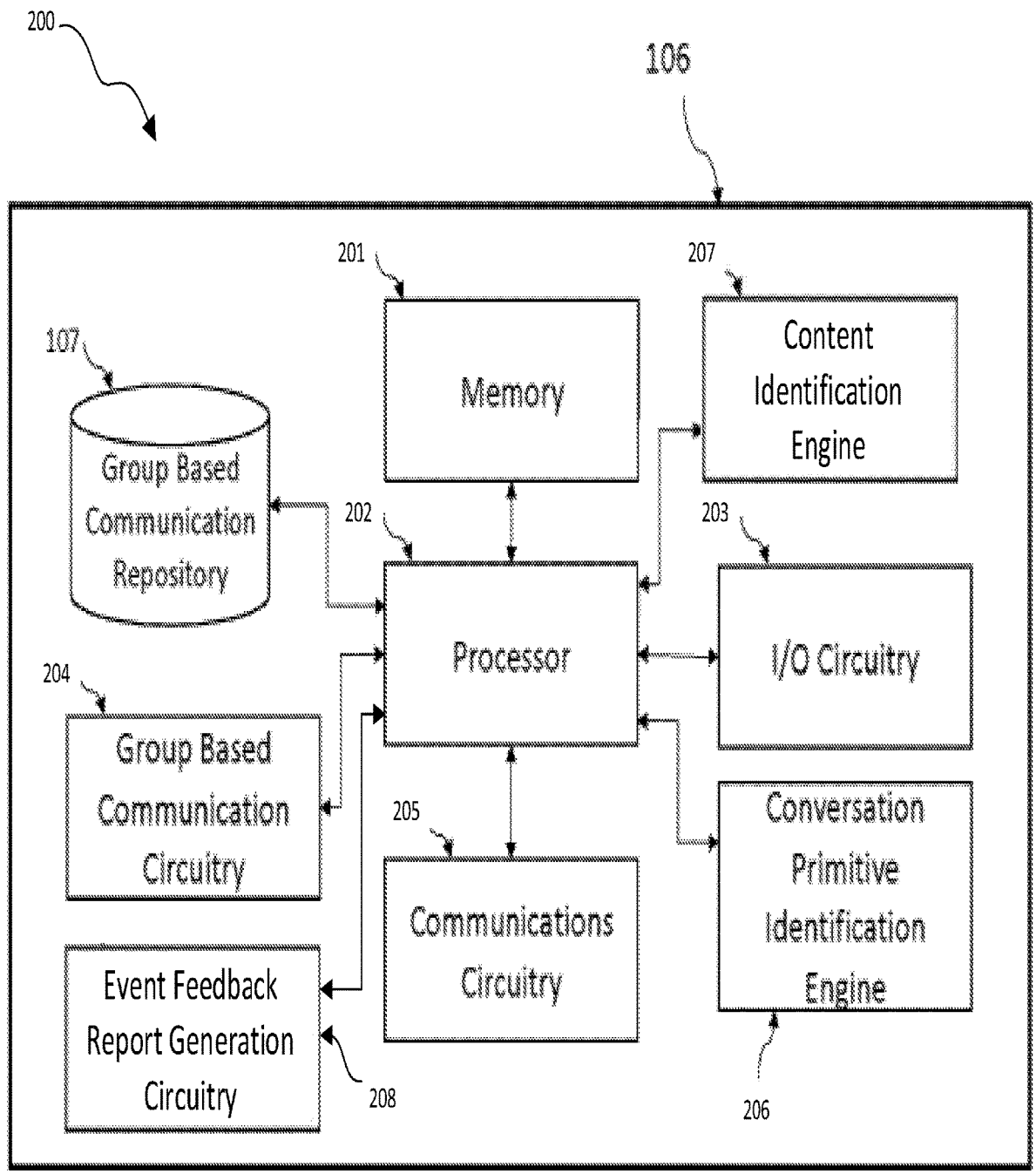
Figure 3:
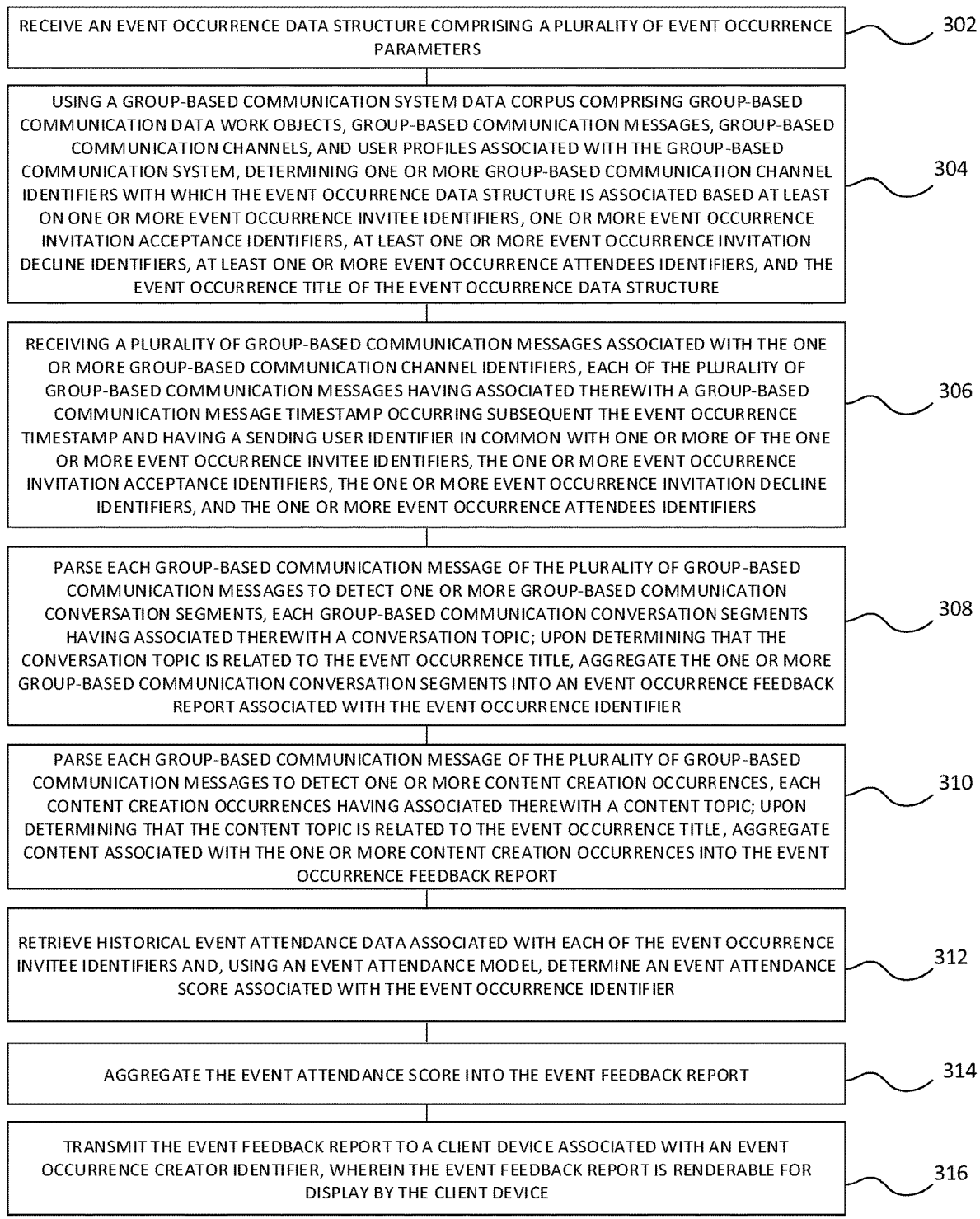
Figure 4:
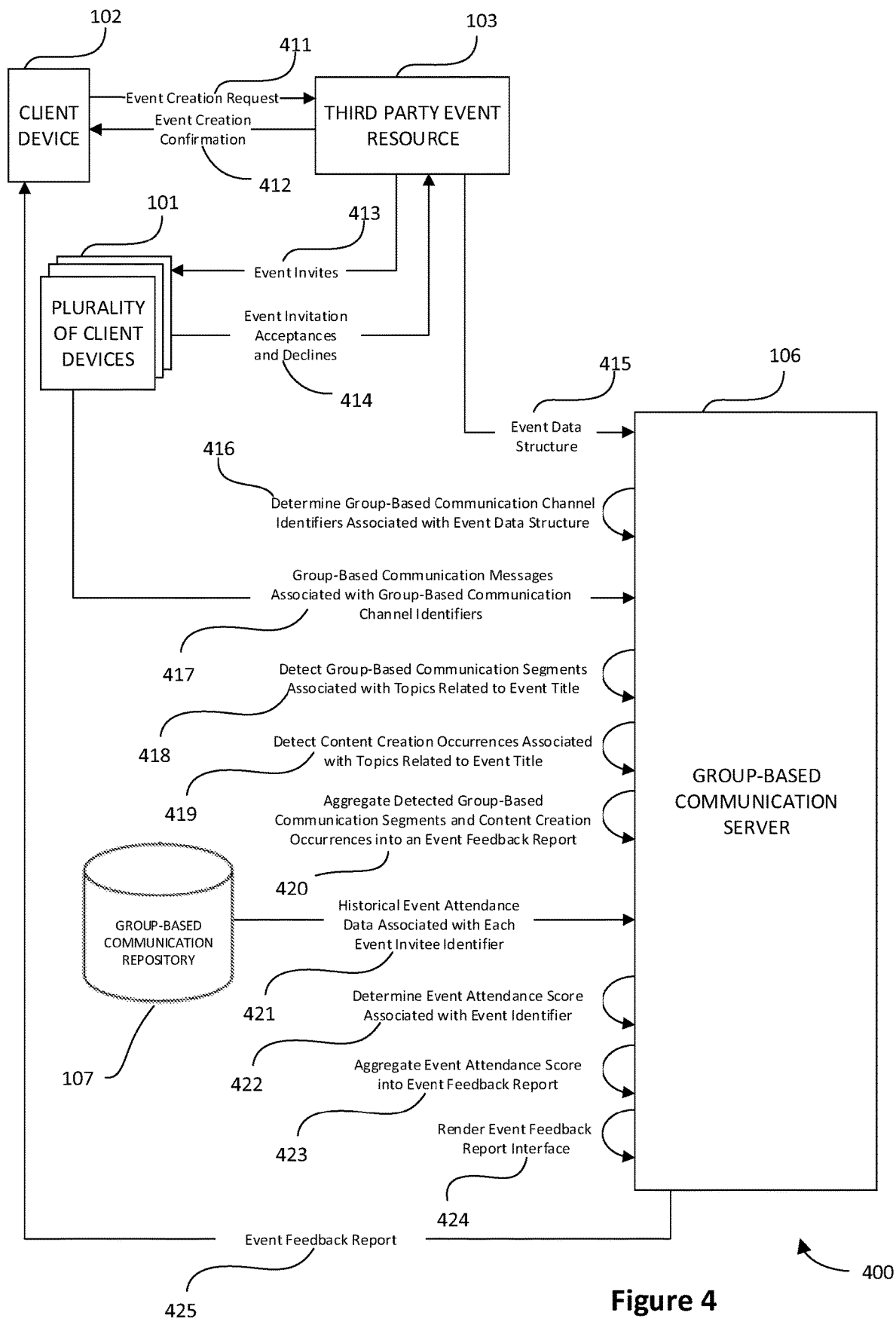

Having thus described the disclosure in general terms, reference will now be made to the accompanying drawings, which are not necessarily drawn to scale, and wherein:

FIG. 1 illustrates an exemplary system architecture in accordance with some embodiments discussed herein;

FIG. 2 illustrates exemplary apparatuses for implementing embodiments of the present disclosure;

FIG. 3 illustrates a flow diagram of an exemplary method for aggregating an event occurrence feedback report for rendering and transmitting to a client device according to embodiments of the present disclosure; and FIG. 4 is a signal diagram illustrating example methods in accordance with some exemplary embodiments of the disclosure.

DETAILED DESCRIPTION

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

The term "event occurrence" refers to a collection of data and instructions that represent an item or resource of a third party event scheduling resource. Each event occurrence is associated with an event occurrence identifier that uniquely identifies a particular event occurrence created within the third party event scheduling resource. An event occurrence may be associated with an event occurrence data structure comprising a plurality of event occurrence parameters, including the event occurrence identifier. Each event occurrence parameter may be one of an event occurrence timestamp, an event occurrence location identifier, an event occurrence start time identifier, an event occurrence run time identifier, an event occurrence completion indicator, an event occurrence creator identifier, an event occurrence invite identifier, an event occurrence acceptance identifier, an event occurrence decline identifier, an event occurrence acceptance identifier, and event occurrence title In embodiments, an event occurrence is an electronic representation of a live in-person event during which one or more attendees gather or collaborate for a particular duration of time. In various embodiments, the live in-person event occurs at one or more physical locations and/or involves audio and/or video connections for said collaboration.

The term "event occurrence feedback report" refers to a collection of data associated with an event occurrence identifier that is aggregated for the purpose of transmitting to a client device associated with an event occurrence creator identifier. The event occurrence feedback report may be renderable for display by the client device. In some embodiments, the even occurrence feedback report may be associated with a group-based communication channel identifier associated with a private group-based communication channel. The event occurrence feedback report may be renderable for display within the private group-based communication channel interface. In various embodiments, the event occurrence feedback report comprises at least the event occurrence timestamp, an event occurrence attendance score, content associated with the one or more content creation occurrences, and one or more group-based communication conversation segments identified as associated with an event occurrence identifier. In one exemplary circumstance, for example, where an event occurrence created by an event occurrence creator has a threshold number of more event invite acceptances than event occurrence attendees, the event occurrence feedback report may provide the event occurrence creator with an event occurrence attendance score indicating the deficiency of the event attendance with respect to the number of invites accepted. By way of further example, where several group-based communication messages within a group-based communication channel associated with the event occurrence are also determined to be related to the event topic, the event occurrence feedback report may further provide the event occurrence creator with each of the group-based communication messages determined to be related to the event occurrence. By way of further example, where content created within a group-based communication channel associated with the event occurrence is also determined to be related to the event topic, the event occurrence feedback report may further provide the event occurrence creator with the content determined to be related to the event occurrence. In various embodiments, the event occurrence creator may, through a selected setting, opt out of receiving an event occurrence feedback report. In various embodiments, the event occurrence feedback report may further comprise data associated with any computing errors (i.e., "bugs") that arose during the event occurrence.

The term "event occurrence completion indicator" refers to one or more items of data associated with an event occurrence identifier that indicate that a particular event occurrence has been completed. For example, an event occurrence completion indicator may be a data structure comprising a flag, or a record of a data structure whereby a logic "1" indicates completion and a login "0" indicates the event occurrence has not been completed. In various embodiments, an event occurrence completion indicator may be sent to an apparatus from a third party event scheduling resource.

The term "event occurrence identifier" refers to one or more items of data by which an event occurrence may be uniquely identified. For example, an event occurrence identifier may comprise ASCII text, a pointer, a memory address, and the like.

The term "third party event scheduling resource" refers to a third party scheduling application provided by way of a remote networked device, such as a server or processing device, maintained by a third party individual, company, or organization. A client device in a group-based communication system may access a third party application provided by the third party event scheduling resource to execute functions, flows, or actions associated with an event occurrence. In some embodiments, the functions, flows, or actions take effect within the third party event scheduling resource to produce an effect within the third party event scheduling resource. In other embodiments, the functions, flows, or actions produce effects within various combinations of the group-based communication system, the third party event scheduling resource, and other servers or systems. In various embodiments, a group-based communication server may interact with a third party event scheduling resource to retrieve historical attendance data associated with each event occurrence invitee identifier associated with an event occurrence identifier. In various embodiments, a group-based communication server may interact with a third party event scheduling resource to retrieve an event occurrence data structure associated with an event occurrence. The event occurrence data structure retrieved by the group-based communication server from the third party event scheduling resource may comprise a plurality of event occurrence parameters, which, for example, may include one or more of an event occurrence identifier, an event occurrence timestamp, an event occurrence location identifier, an event occurrence start time identifier, an event occurrence run time identifier, an event occurrence completion indicator, an event occurrence invitee identifier, an event occurrence invitation acceptance identifier, an event occurrence invitation decline identifier, an event occurrence attendee identifier, and an event occurrence title. In various embodiments, the event occurrence data structure may be associated with one or more group-based communication channel identifiers.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined herein.

The term "event occurrence data structure" refers to a collection of data associated with an event occurrence capable of being transmitted, received, and/or stored. In various embodiments, the event occurrence data structure may comprise a plurality of event occurrence parameters. In various embodiments, the event occurrence data structure may be associated with one or more group-based communication channel identifiers.

The term "event occurrence parameter" refers to a collection of data that defines one or more aspects of an event occurrence. In various embodiments, an event occurrence parameter may be one of an event occurrence identifier, an event occurrence timestamp, an event occurrence location identifier, an event occurrence start time identifier, an event occurrence run time identifier, an event occurrence completion indicator, an event occurrence invitee identifier, an event occurrence invitation acceptance identifier, an event occurrence invitation decline identifier, an event occurrence attendee identifier, an event occurrence participant identifier, or an event occurrence title.

The term "event occurrence timestamp" refers to a digital representation of network time associated with at least one of the receipt, commencement, conclusion or run time of an event occurrence. The event occurrence timestamp may comprise a digital representation of one or more of the network time at which the event occurrence was created by the event occurrence creator, the network time at which the event occurrence was scheduled to begin, the network time at which the event was scheduled to end, the network time at which the event occurrence actually began, the network time at which the event occurrence actually ended, and the actual event occurrence run time. The timestamp may be analyzed to determine context regarding the event occurrence (e.g., the exact moment at which the event occurrence concluded and the proximity of that moment to the group-based communication message timestamp of a group-based communication message that was sent in a group-based communication channel). The event occurrence timestamp may be associated with an event occurrence identifier. The timestamp may be analyzed to determine context regarding the event (e.g., the exact moment at which the event started and/or ended, as well as the corresponding event run time). In various embodiments, the event timestamp may be an event occurrence parameter.

The term "event occurrence creator identifier" refers to one or more items of data by which an event occurrence creator that creates an event occurrence using a third party event scheduling resource may be uniquely identified. For example an event occurrence creator identifier may comprise ASCII text, a pointer, a memory address, and the like. In various embodiments, the event occurrence creator identifier may be associated with a client device and a user profile within a group-based communication system. In various embodiments there may be one or more event occurrence creator identifiers associated with an event occurrence.

The term "event occurrence invitee identifier" refers to one or more items of data by which an event occurrence invitee may be uniquely identified. An event occurrence invitee identifier may be associated with a user who receives an invitation to participate in an event occurrence and has the option to either accept or decline the invitation. For example an event occurrence invitee identifier may comprise ASCII text, a pointer, a memory address, and the like. In various embodiments, the event occurrence invitee identifier may be an event occurrence parameter.

The term "event occurrence invitation acceptance identifier" refers to one or more items of data by which an event occurrence invitation acceptance may be uniquely identified. An event occurrence invite acceptance identifier may be associated with a user (i.e., an event occurrence invitee associated with an event occurrence invitee identifier) who receives an invitation to participate in an event occurrence associated with an event occurrence creator identifier and accepts the invitation. Accordingly, an event occurrence invitation acceptance identifier is associated with an event occurrence invitee identifier. For example an event occurrence invite acceptance identifier may comprise ASCII text, a pointer, a memory address, and the like. In various embodiments, the event occurrence invite acceptance identifier may be an event occurrence parameter.

The term "event occurrence invitation decline identifier" refers to one or more items of data by which an event occurrence invitation decline may be uniquely identified. An event occurrence invite decline identifier may be associated with a user (i.e., an event occurrence invitee associated with an event occurrence invitee identifier) who receives an invitation to participate in an event occurrence associated with an event occurrence creator identifier and declines the invitation. Accordingly, an event occurrence invitation decline identifier is associated with an event occurrence invitee identifier. For example an event occurrence invite decline identifier may comprise ASCII text, a pointer, a memory address, and the like. In various embodiments, the event occurrence invite decline identifier may be an event occurrence parameter.

The term "event occurrence attendee identifier" refers to one or more items of data by which an event occurrence attendee may be uniquely identified. An event occurrence attendee may be a user (i.e., an event occurrence invitee associated with an event occurrence invitee identifier) who actually attends an event occurrence associated with an event occurrence creator identifier. Accordingly, an event occurrence attendee identifier is associated with an event occurrence invitee identifier. In some embodiments, an event occurrence attendee identifier is distinct from and independent of both an event occurrence invitation acceptance identifier and an event occurrence invitation decline identifier. That an event occurrence invitee either accepts or declines an event occurrence invite is a digital representation of the invitee's intention or lack thereof to participate in the event occurrence; such an acceptance or decline does not necessarily affect whether or not that invitee actually participates in the event occurrence. For example an event occurrence attendee identifier may comprise ASCII text, a pointer, a memory address, and the like. In various embodiments, the event occurrence attendee identifier may be an event occurrence parameter.

The term "event occurrence participant identifier" refers to one or more items of data by which an event occurrence participant may be uniquely identified. An event occurrence participant may be a user (i.e., an event occurrence invitee associated with an event occurrence invitee identifier) who actually attends an event occurrence associated with an event occurrence creator identifier and engages in the event by, for example, asking a question associated with the event occurrence, answering a question associated with the event occurrence, creating content associated with the event occurrence, or any other affirmative act intended to contribute to the event occurrence or engage with the event occurrence creature during the event occurrence. Accordingly, an event occurrence participant identifier is associated with both an event occurrence invitee identifier and an event occurrence attendee identifier. In some embodiments, an event occurrence participant identifier is distinct from and independent of both an event occurrence invitation acceptance identifier and an event occurrence invitation decline identifier. That an event occurrence invitee either accepts or declines an event occurrence invite is a digital representation of the invitee's intention or lack thereof to participate in the event occurrence; such an acceptance or decline does not necessarily affect whether or not that invitee actually participates in the event occurrence. For example an event occurrence participant identifier may comprise ASCII text, a pointer, a memory address, and the like. In various embodiments, the event occurrence participant identifier may be an event occurrence parameter.

The term "event occurrence title" refers to an event occurrence creator designated title associated with an event occurrence. In various embodiments, the event occurrence title may be representative of a purpose or topic associated with the event occurrence. In various embodiments, the event occurrence title may be analyzed to determine its relation to a conversation topic or a content topic for the purposes of detecting conversations and content associated with an event occurrence. For example, the event occurrence title may comprise one or more strings of text or other characters (e.g., emojis).

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system data corpus" refers to a collection of data that has been received by a group-based communication system through group-based communication interfaces. In some embodiments, a group-based communication system data may comprise one or more of a group-based communication data work objects, group-based communication messages, group-based communication channels, and user profiles associated with the group-based communication system.

As used herein, the terms "group-based communication object," "group-based communication data object," and "group-based communication data works object" refer to a collection of data and instructions that represent an item or resource of the group-based communication system. Each group-based communication object has an object identifier that uniquely identifies a particular group-based communication object in the group-based communication system and an object type, which describes the category of objects to which the group-based communication object belongs. In some embodiments, users may perform actions via a group-based communication interface that create or modify group-based communication objects. Example group-based communication objects include group-based communication channels, user profile identifiers, indications of user profiles (such as pointers with reference to user profiles), files created and maintained in the group-based communication system, files linked or uploaded to the group-based communication system, user accounts, emojis posted in a group-based communication channel, emojis available in a group-based communication channel, metadata associated with group-based communication messages such as an author identifiers, a post timestamp, a channel identifier, user identifiers of users with access rights to the group-based communication message, and the like.

As used herein, the term "group-based communication message" refers to any electronically generated digital content object provided by a user that has security sufficient such that it is accessible only to a defined group of users and that is configured for display within a group-based communication channel. Communication messages may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a timestamp associated with post of the message, a sending user identifier, a message identifier, message contents, a group identifier, a group-based communication channel identifier, a thread identifier, and the like. Each of the foregoing identifiers may comprise ASCII text, a pointer, a memory address, and the like.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) may be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a plurality of historical conversation primitives associated with the user profile, an avatar, an email address, a real name (e.g., John Doe), a username (e.g., jdoe), a password, a real name, a time zone, a status, conversation segments associated with the user, metadata indicating historical messages with same conversation primitive shared with other user profiles, and the like. The user account details can include a subset designation of user credentials, such as, for example, login information for the user including the user's username and password.

The term "group-based communication system" refers to the platform through which client devices may communicate and interact in a group-based setting. The group-based communication system may comprise a number of devices and/or components used to store, access, modify, and otherwise maintain data. The group-based communication system may include at least one of a group-based communication repository or a client device and may be associated with user profiles.

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel. In various embodiments, a private group-based communication channel may be associated with a group-based communication channel identifier. In various embodiments, a private group-based communication channel may be associated with an event occurrence. In such a configuration, only the event occurrence creator and the event occurrence invitees have access to the private group-based communication channel.

The term "group-based communication repository" refers to a computing location where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository may be distributed over a plurality of remote storage locations only.

The term "group-based communication channel identifier" refers to one or more items of data by which a group-based communication channel may be uniquely identified. For example, a group-based communication channel identifier may comprise ASCII text, a pointer, a memory address, and the like.

The term "group-based communication message timestamp" refers to a digital representation of network time associated with receipt of a group-based communication message by a group-based communication system. The timestamp may be analyzed to determine context regarding the message (e.g., the exact moment at which the message was sent in a group-based communication channel).

The term "subsequent" refers to a description of the relative timing of an action or occurrence, where the occurrence at issue occurs chronologically after a first action or occurrence. In embodiments, subsequent refers to a relationship among a sequence of two or more network timestamps.

A "sending user identifier" is a user identifier that is associated with a collection of messages that are sent by a particular user (i.e., a client device associated with the particular user). These messages may be analyzed to determine context regarding the user (e.g., the user's expertise or interest in a topic may be determined based on the frequency with which the user sends messages detected to be associated with the topic or key words associated with the topic within such messages).

The term "group-based communication conversation segment" refers to a set of communication messages grouped by a server in a group-based communication system where all communication messages within the conversation segment are determined to have at least one identical conversation primitive identifier. In some embodiments, communication messages in one conversation segment are directed to the same topic. In some embodiments, the set of communication messages in one conversation segment has message send order proximity, message send time proximity, and sending user identifier proximity that exceeds a respective defined threshold. In some embodiments, one conversation segment may be determined to be related to another conversation segment and one conversation segment may include several conversation segments. In some embodiments, a conversation segment may be grouped by a server by using a conversation segmenting learning model, which may be derived using one or more group-based communication message corpuses.

The term "conversation topic" refers to a theme or point of discussion upon which a group-based communication conversation may be focused. The conversation topic is programmatically determined based upon parsing of text strings contained within one or more group-based communication conversation messages associated with a particular group-based communication conversation. In various embodiments, group-based communication conversation segments may each be associated with a conversation topic. In various embodiments, a conversation topic may be analyzed to determine its relation to an event occurrence title for the purposes of detecting conversations associated with an event occurrence.

The term "content creation occurrence" refers to a collection of data and instructions that represent the electronic creation of content, where the content may be one of a file, an event, a task, or any other data or collection of data capable of being transmitted, received, and/or stored. In various embodiments, a content creation occurrence may be associated with a content topic and may be detected from a plurality of group-based messages. For example, a client device interacting with a group-based communication system may, within a group-based communication interface, create one of a group-based communication channel, a user profile identifier, an indication of user profile (such as a pointer with reference to a user profile), a file created and maintained in either a third party event scheduling resource or the group-based communication system, a file linked or uploaded to the group-based communication system, a file referenced via URL, a user account, an event occurrence, metadata associated with group-based communication messages such as an author identifiers, a post timestamp, a channel identifier, a user identifier of a user with access rights to the group-based communication message, and the like. Content associated with a content creation occurrence may be compiled and consolidated into an event occurrence feedback report event occurrence feedback for presentation to a client device associated with an event occurrence creator.

The term "content topic" refers to a theme or point of discussion upon which content may be focused. The content topic is programmatically determined based upon parsing of text strings contained within one of a file, an event, or any other data or collection of data capable of being transmitted, received, and/or stored. For example, the message may be parsed using a machine learning technique, such as topic modeling (e.g., Latent Dirichlet allocation topic modeling), to determine topics associated with the message. In various embodiments, content creation occurrences may each be associated with a content topic. In various embodiments, a content topic may be parsed (e.g., using PHP commands) to determine its relation to an event occurrence title for the purposes of detecting content associated with an event occurrence.

The term "historical event occurrence attendance data" refers to a collection of data that comprises an event occurrence invitee identifier and historical data associated therewith, namely event occurrence identifiers, event occurrence invite acceptance identifiers, event occurrence invite decline identifiers, and/or event occurrence attendee identifiers. In other words, each event occurrence invitees has historical event occurrence attendance data associated therewith. Historical event occurrence attendance data may comprise an event occurrence invite, an event occurrence acceptance, an event occurrence decline, and/or an event occurrence attendance. In various embodiments, an event occurrence decline may be uniquely identified by an event occurrence invitation decline identifier, an event occurrence acceptance may be uniquely identified by an event occurrence acceptance decline identifier, an event occurrence invite may be uniquely identified by an event occurrence acceptance invite identifier, and an event occurrence attendance may be uniquely identified by an event occurrence attendance decline identifier, The historical event occurrence attendance data may be associated with each of the event occurrence invitee identifiers and may be used to determine an event occurrence attendance score. In various embodiments, the historical event occurrence attendance data may be received from either a third party event scheduling resource or a group-based communication repository.

The term "event occurrence attendance model" refers to using a machine learning model configured to compare the historical event occurrence attendance data associated with each of the event occurrence invitee identifiers to predetermined benchmarks and/or suggested best practices associated with one or more common event occurrence parameters. In some embodiments the event occurrence attendance model may be configured to compare the historical event occurrence data associated with each of the event occurrence invitee identifiers to the historical event occurrence data from other previously concluded event occurrences associated with one or more of the same event occurrence creator identifiers. In various embodiments, the predetermined benchmarks and/or suggested best practices may be comprised of other events occurrences that have already concluded, are associated with common event occurrence creator identifiers, and have received a high event occurrence attendance score. The event occurrence attendance model may be configured to receive one or more event occurrence parameters associated with an event occurrence identifier as an input and output an event occurrence attendance score. In various embodiments, the output of the event occurrence attendance model may be based on one or more of event occurrence data structures with one or more common event occurrence parameters and/or events occurrences that have already concluded and are associated with common event occurrence creator identifiers. In various embodiments, the event occurrence attendance model may be trained using a plurality of historical event occurrence attendance data.

The term "an event occurrence attendance score" refers to a value that represents the relative success of an event based on how well the event occurrence was attended by the event occurrence invitees. In various embodiments, the event occurrence attendance score may be determined using an event occurrence attendance model and based on historical event occurrence attendance data. The event occurrence attendance score is programmatically determined based a comparison of the historical event occurrence attendance data associated with each of the event occurrence invitee identifiers to predetermined benchmarks and/or suggested best practices associated with one or more common event occurrence parameters. The event occurrence attendance data may be aggregated and included in the event occurrence feedback report. The event occurrence attendance score may be associated with an event occurrence identifier. In various embodiments, the event occurrence attendance score may be determined based at least on the overachievement or deficiencies of the historical event occurrence attendance data associated with each of the event occurrence invitee identifiers in comparison to the historical event occurrence data from other previously concluded event occurrences associated with one or more of the same event occurrence creator identifiers.

As used herein, the term "conversation primitive identifier" refers to an element used to analyze, index, store, communication messages. In one embodiment, a conversation primitive identifier may be determined based on analysis of topics discussed in the communication message and other communication messages (e.g., in the same channel or thread) and/or proximity (e.g., message send order proximity, message send time proximity, and/or sending user identifier proximity) of these messages. In another embodiment, a conversation primitive identifier may be determined based solely on message send order proximity, message send time proximity, and/or sending user identifier proximity. In some embodiments, the conversation primitive identifier is an identifier used by a learning model to indicate that a set of communication messages are in the same conversation segment. Different linguistic and natural language patterns may be used by the learning model or used to train the learning model.

As used herein, the term "message send order proximity" refers to a proximity measure for messages associated with the same channel identifier determined based on number of messages with the same channel identifier with time stamp data between two or more communication messages in the same group-based communication channel. In one example embodiment, if a user sends communication message A in a particular group-based communication channel and another user sends communication message B in the same channel before any other communication message is posted in the channel, message A and message B would be determined to have message send order proximity of 1 which indicates highest possible proximity in this embodiment.

As used herein, the term "message send time proximity" refers to a proximity measure determined based on difference of time in time stamp data associated with two or more communication messages in the same group-based communication channel. In one example embodiment, if a user sends communication message A in a particular group-based communication channel at 19:02:35 and another user sends communication message B in the same channel at 19:02:40, message A and message B would be determined to have message send time proximity of 5 seconds.

As used herein, the term "sending user identifier proximity" refers to a proximity measure determined based on how closely related the sending users of two or more communication messages in the same group-based communication channel are. For example, if the sending user for two communication messages are the same user, the two communication messages will be determined to have the highest sending user identifier proximity. In another example, if the sending user for two communication messages shares multiple common workspaces and/or group-based communication channels, the two communication messages will be determined to have a high sending user identifier proximity. If the sending user for two communication messages shares only one common workspaces and/or group-based communication channels, the two communication messages will be determined to have a low sending user identifier proximity.

As used herein, the term "event occurrence feedback report interface" refers to virtual environment configured to render the event occurrence feedback report within a group-based communication system and facilitate user interaction with the rendered event occurrence feedback report. The event occurrence feedback report interface may be accessed using a client device. In various embodiments, the event occurrence feedback report interface may be further accessed in a private group-based communication channel associated with the event occurrence. Each event occurrence feedback report interface is accessible and viewable to an event occurrence creator associated with the event occurrence.

As used herein, the terms "overachievements" and "deficiencies" refer to a discrepancy between historical event occurrence attendance data associated with each event occurrence invitee identifiers and the historical event occurrence attendance data to which it is being compared. An overachievement exists when the historical event occurrence attendance data of an event occurrence outperforms the data to which it is being compared. A deficiency exists when the historical event occurrence attendance data of an event occurrence has a lower value than the data to which it is being compared. For example, the historical event occurrence attendance data of an event occurrence may outperform the data to which it is being compared when the ratio of event occurrence acceptances to event occurrence declines is higher than that of the event occurrence to which it is being compared. Further, for example, the historical event occurrence attendance data of an event occurrence may outperform the data to which it is being compared when the ratio of event occurrence attendees to event occurrence invites is higher than that of the event occurrence to which it is being compared, or when the number of event occurrence acceptances or the number of event occurrence attendees is more than that of the event occurrence to which it is being compared.

As used herein, the term "event occurrence feedback data" refers to a plurality of data that defines one or more aspects of an event occurrence. The event occurrence feedback data may be associated with an event occurrence identifier. In certain embodiments, the event occurrence feedback data may include at the least historical event occurrence attendance data associated with the event occurrence, the group-based communication messages associated with the event occurrence, or the content associated with the event occurrence. The event occurrence feedback data may be aggregated into an event occurrence feedback report to be transmitted to a client device associated with an event occurrence creator identifier and renderable for display by the client device. In embodiments, the event occurrence feedback report is renderable for display within a private group-based communication channel associated with or created for an event occurrence.

Overview

In general, embodiments of the present invention provided herein include methods, apparatus, and computer program products for generating an event occurrence feedback report after receipt of an event occurrence completion indicator, the event occurrence completion indicator associated with an event occurrence identifier and received from a third party event scheduling resource, and for presenting the event occurrence feedback report within a group-based communication interface.

A group-based communication channel may integrate third party applications. In various embodiments, content may be created in the third party application using a third party event scheduling resource and that content may be associated with a group-based communication channel. In such a circumstance, the event occurrence may be hosted by a third party event scheduling resource, and an event occurrence creator may use an associated group-based communication channel to invite guests to the event, start a discussion or solicit questions about an event or event topic, or even search for users unknown to the creator that may be interested in the event occurrence. In some embodiments, the integrated third party application may include, but is not limited to, for example, one of G-Drive, Paper, JIRA, and Asana.

Upon completion of an event occurrence, the event occurrence creator may want to view historical event occurrence attendance data such as the number and identity of each of the event occurrence invitees, event occurrence acceptances (i.e. the event occurrence invitees who accepted the event occurrence invite), event occurrence declines (i.e. the event occurrence invitees who declined the event occurrence invite), and the event occurrence attendees (i.e. the event occurrence invitees who actually attended the event occurrence invite). Further, the event occurrence creator may want to access communication messages associated with the event occurrence. For example, the group-based communication messages associated with the event may highlight questions raised by event occurrence attendees or other subsequent messages that discussing the event occurrence. Further, the event occurrence creator may want to access any content created that is associated with the event occurrence (e.g., any event occurrences that are associated with the creator's event occurrence and were created subsequent to the completion of the event).

Where such information may be vast and may, in various embodiments, be stored on a third party event scheduling resource, an event occurrence creator's access to said information is often limited and difficult for a normal user to acquire. The lack of access to an aggregated and consolidated compilation of data associated with an event occurrence forces an event occurrence creator to engage in a high number of search query requests associated with an event occurrence. Similarly, the corresponding search query results are inherently slow, as the relevant information may be dispersed throughout the group-based communication system or third-party event scheduling resource. The dispersion of data throughout the group-based communication interface forces users to engage in a burdensome amount of scrolling to locate and display all of the sought after information.

Accordingly, the present disclosure provides a technological improvement that results in an aggregation and consolidation of the event occurrence feedback data associated with an event occurrence into a single event occurrence feedback report to be rendered and relayed to a client device associated with an event occurrence creator identifier after completion of the event occurrence. In embodiments, the event occurrence feedback report is renderable for display within a private group-based communication channel associated with or created for an event occurrence.

An aggregated and consolidated event occurrence feedback report associated with an event occurrence results in a reduction of search query requests associated with an event occurrence because the event occurrence feedback report eliminates the need for users to perform multiple search queries to determine and retrieve information associated with an event that has occurred. Similarly, the aggregation and consolidation of the information sought after by the event occurrence creator into a single interface results in faster query results due to a reduction in indexing needs. The consolidation of data into a single interface eliminates the need for a user to unnecessarily scroll throughout an interface to locate and display all of the sought after information.

Exemplary Architecture & Apparatuses

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 and/or a third party event scheduling resource 103 via a communications network 108 using client device 102 or any one or more of a plurality of client devices 101A-101N. The group-based communication system 105 may comprise a group-based communication server 106 in communication with at least one group-based communication repository 107.

The communications network 108 through which the group-based communication system 105 and the third party event scheduling resource 103 may be accessed may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 108 may include a cellular telephone, an 802.11, 802.16, 802.20, and/or WiMax network. Further, the communications network 108 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedure call), JSON over REST ("Representational State Transfer")/HTTP ("HyperText Transfer Protocol"), and the like.

The group-based communication server 106 may be embodied as a computer or computers configured to perform functions as described herein. The group-based communication server 106 may provide for receiving of electronic data from various sources, including but not necessarily limited to the client device 102, any one or more of the plurality of client devices 101A-101N, and the third party event scheduling resource 103. For example, the group-based communication server 106 may be operable to receive and post or transmit group-based messaging communications provided by the client device 102 or any one or more of the plurality of client devices 101A-101N. Further, for example, the group-based communication server 106 may be operable to receive an event occurrence data structure from the third party event scheduling resource 103. The event occurrence data structure may comprise a plurality of event occurrence parameters, which, for example, may be one of an event occurrence identifier, an event occurrence timestamp, an event occurrence location identifier, an event occurrence start time identifier, an event occurrence run time identifier, an event occurrence completion indicator, an event occurrence invitee identifier, an event occurrence invitation acceptance identifier, an event occurrence invitation decline identifier, or event occurrence attendee identifier, or an event occurrence title. In some embodiments, for example, as shown in FIG. 1, the group-based communication server 106 may be configured to request and receive historical event occurrence attendance data associated with each event occurrence invitee identifiers from the third party event scheduling resource 103. In some embodiments, for example, as shown in FIG. 1, the group-based communication server 106 may be configured to request and receive historical event occurrence attendance data associated with each event occurrence invitee identifiers from the group-based communication repository 107. The group-based communication server 106 may be operable to transmit an event occurrence feedback report to a client device 102 associated with an event occurrence creator identifier. The group-based communication server 106 may further be operable to render the event occurrence feedback report within an interface for display by the client device 102 (e.g., by way of transmitting instructions to the client device for rending the event occurrence feedback report within an interface). In embodiments, the event occurrence feedback report is renderable for display within a private group-based communication channel associated with or created for an event occurrence.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like. Further, as shown in FIG. 2, for example, the group-based communication repository 107 may include, without limitation, a plurality of historical event occurrence attendance data. In other embodiments, as shown in FIG. 1, for example, the historical event occurrence attendance data may be stored in or managed by the third party event scheduling resource 103.

The client device 102 may be associated with at least an event occurrence creator identifier. The client devices 101A-101N may define a plurality of client devices 101A-101N and may be associated with one or more of an event occurrence invitee identifier, an event occurrence acceptance identifier, an event occurrence decline identifier, and an event occurrence attendee identifier. The client device 102 or any one or more of the plurality of client devices 101A-101N may be any computing device as defined above. Electronic data received by the group-based communication server 106 from the plurality of client devices 101A-101N may be provided in various forms and via various methods. For example, the client devices 101A-101N may include desktop computers, laptop computers, smartphones, netbooks, tablet computers, wearables, and the like.

In embodiments where a client device 102 or any one or more of the plurality of client devices 101A-101N is a mobile device, such as a smartphone or tablet, the client device 102 or any one or more of the plurality of client devices 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Alternatively, the client device 102 or any one or more of the plurality of client devices 101A-101N may interact with either one or both of the third party event scheduling resource 103 and the group-based communication system 105 via a web browser. As yet another example, the client device 102 or any one or more of the plurality of client devices 101A-101N may include various hardware or firmware designed to interface with the group-based communication system 105.

The third party event scheduling resource 103 may be embodied as a computer or computers as described herein. The third party event scheduling resource 103 may provide for receiving of electronic data from various sources, including but not necessarily limited to the client device 102, any one or more of the plurality of client devices 101A-101N, and group-based communication server 106. For example, a client device 102 or any one or more of the plurality of client devices 101A-101N may access a third party event scheduling application provided by the third party event scheduling resource 103 to execute functions, flows, or actions associated with an event occurrence. In such a configuration, the third party event scheduling resource 103 may be operable to receive an event occurrence creation request from a client device 102 and send an event occurrence creation confirmation to the client device 102 in response. Further, the third party event scheduling resource 103 may be operable to send any event occurrence invites to any one or more of the plurality of client devices 101A-101N associated with one or more event occurrence invitee identifiers and receive any event occurrence acceptances or event occurrence declines from the one or more of the plurality of client devices 101A-101N associated with one or more event occurrence invitee identifiers. In various embodiments, for example, the third party event scheduling resource 103 may be configured to store historical event occurrence attendance data associated with the event occurrence invitee identifiers. In such a configuration, the third party event scheduling resource 103 may be operable to send the historical event occurrence attendance data associated with each of the event occurrence invitee identifiers to a group-based communication server 106. The third party event scheduling resource 103 may be operable to send an event occurrence data structure to a group-based communication server 106.

In some embodiments of an exemplary group-based communication system 105, a message or messaging communication may be sent from a client device 102 or any one or more of the plurality of client devices 101A-101N to a group-based communication system 105. In various implementations, the message may be sent to the group-based communication system 105 over communications network 108 directly by a client device 102 or any one or more of the plurality of client devices 101A-101N, the message may be sent to the group-based communication system 105 via an intermediary such as a message server, and/or the like. For example, the client device 102 or any one or more of the plurality of client devices 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 102 or any one or more of the plurality of client devices 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
        <clientj>roduct_type>iPhone6,1</client_product_type>
        <client_serial_number>DNXXX1X1XXXX</client_serial_number>
        <client_UDID>3XXXXXXXXXXXXXXXXXXXXXXXD
        </client_UDID>
        <client_OS>iOS</client_OS>
        <client_OS_version>7.1.1</client_OS_version>
        <client_app_type>app with webkit</client_app_type>
        ˜app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP> 10.0.0.123</client_IP>
        <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
        <clientj>roduct_type>iPhone6,l</client_product_type>
        <client_serial_number>DNXXX1X1XXXX</client_serial_number>
        <client_UDID>3XXXXXXXXXXXXXXXXXXXXXXXD
        </client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us;
Nexus S Build/IMM76D) AppleWebKit/534.30 (KHTML, like Gecko)
Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-xXXX-
XXXXXXXXXXXXX</client UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number> YXXXXXXXXZ</client_serial_number>
```

```
    <client_UDID>FXXXXXXXXX-XXXX-XXXX-XXXX-
XXXXXXXXXXXXX</client UDID>
      <client_OS>Mac OS X</client_OS>
      <client_OS_version>10.9.3</client_OS_version>
      <client_app_type>web browser</client_app_type>
      <client_name>Mobile Safari</client_name>
      <client version>537.75.14</client version>
    </client_details>
    <message>
      <message_identifier>ID_message_10</message_identifier>
      <team_identifier>ID_team_1</team_identifier>
      <channel_identifier>ID_channel_1</channel_identifier>
      <contents>That is an interesting invention. I have attached a copy our
patent policy.</contents>
      <attachments>patent_policy.pdf</attachments>
    </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive identifier data, and/or the like. For example, the group-based communication server 106 may provide the following example storage message, substantially in the form of a HTTP(S) POST message including XML-formatted data, as provided below:

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive identifier) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive identifier may be associated with the message. In one implementation, a conversation primitive identifier is an element used to analyze, index, store, and/or the like messages. In one embodiment, a conversation primitive identifier may be determined based on analysis of topics discussed in the communication message and other communication messages (e.g., in the same channel or thread) and/or proximity (e.g., message send order proximity, message send time proximity, and/or sending user identifier proximity) of these messages. In another embodiment, a conversation primitive identifier may be determined based solely on message send order proximity, message send time proximity, and/or sending user identifier proximity. For example, the message may be analyzed by itself, and may form its own conversation primitive identifier. In another example, the message may be analyzed along with other messages that make up a conversation, and the messages that make up the conversation may form a conversation primitive identifier. In one implementation, the conversation primitive identifier may be determined as the message, a specified number (e.g., two) of preceding messages and a specified number (e.g., two) of following messages. In another implementation, the conversation primitive identifier may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive identifier) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository 107, group-based communication circuitry 204, a conversation primitive identification engine 206, a content identification engine 207, and event occurrence feedback report generation circuitry 208. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus 200 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed. In some embodiments, the processor 202 is coupled with either or both of a conversation primitive identification engine 206 and a content identification engine 207.

The conversation primitive identification engine 206 may take the form of, for example, a code module, a component, circuitry and/or the like. The conversation primitive identification engine 206 may include a conversation segmenting learning model derived by, for example, training using thread message corpuses. In some examples, the conversation primitive identification engine 206 is configured to access or otherwise ingest thread message corpuses or other collections of group-based communication messages or objects in the group-based communication repository 107. In some embodiments, the conversation primitive identification engine 206 includes a thread identification module configured to parse a group-based communication message corpus to generate one or more thread message corpuses.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

The content identification engine 207 may take the form of, for example, a code module, a component, circuitry and/or the like. In some examples, the content identification engine 207 is configured to access or otherwise ingest content received by the group-based communication system and content stored in the group-based communication repository 107.

The event occurrence feedback report generation circuitry 208 may be any means such as a device or circuitry embodied in either hardware or a combination of hardware and software that is configured to generate an event occurrence feedback report as described herein. The event occurrence feedback report generation circuitry 208 may utilize processing circuitry, such as the processor 202, to perform these actions. The event occurrence feedback report generation circuitry 208 may send and/or receive data from either one or both of the group-based communication repository 107. It should also be appreciated that, in some embodiments, the event occurrence feedback report generation circuitry 208 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Generating and Presenting an Event Occurrence Feedback Report

FIG. 3 illustrates a flow diagram of an example method 300 in accordance with some embodiments discussed herein.

At block 302, the group-based communication server 106 is configured to receive an event occurrence data structure comprising a plurality of event occurrence parameters. The event occurrence data structure may be received from the third party event scheduling resource 103. In some embodiments, the event occurrence data structure may further comprise an event occurrence completion indicator. In various embodiments, the event occurrence parameters may be one or more of an event occurrence identifier, an event occurrence timestamp, an event occurrence invitee identifier, an event occurrence invitation acceptance identifier, an event occurrence invitation decline identifier, or event occurrence attendee identifier, or an event occurrence title.

After the group-based communication server 106 receives the event occurrence data structure from the third party event scheduling resource 103, at 304, the server 106 is configured to determine one or more group-based communication channel identifiers with which the event occurrence data structure is associated using a group-based communication system data corpus. The group-based communication system data corpus may comprise group-based communication data work objects, group-based communication messages, group-based communication channels, and user profiles associated with the group-based communication system 105. Such a determination may be based on one or more of an event occurrence invitee identifier, an event occurrence invitation acceptance identifier, an event occurrence invitation decline identifier, an event occurrence attendee identifier, and the event occurrence title of the event occurrence data structure.

After the server 106 determines one or more group-based communication channel identifiers with which the event occurrence data structure is associated, at 306, the server 106 is configured to receive a plurality of group-based communication messages associated with the one or more group-based communication channel identifiers. Each of the plurality of group-based communication messages may have associated therewith a group-based communication message timestamp occurring subsequent the event occurrence timestamp and may have a sending user identifier in common with one or more of the one or more event occurrence invitee identifiers, the one or more event occurrence invitation acceptance identifiers, the one or more event occurrence invitation decline identifiers, and the one or more event occurrence attendee identifiers.

After the server 106 receives a plurality of group-based communication messages associated with the one or more group-based communication channel identifiers, at 308, the server 106 is configured to parse each group-based communication message of the plurality of group-based communication messages to detect one or more group-based communication conversation segments. Each of the group-based communication segments may have a conversation topic associated therewith. The server 106 may be further configured to, upon determining that the conversation topic is related to the event occurrence title, aggregate the one or more group-based communication conversation segments into an event occurrence feedback report associated with the event occurrence identifier. In some embodiments, communication messages with the same conversation primitive identifier are grouped together to construct a conversation segment. In some embodiments, a communication message may be grouped into multiple conversation segments. In some embodiments, parsing each of the group-based communication messages into one or more communication message segments uses a machine learning model that has been trained using a group-based communication message corpus. In some embodiments, the group-based communication conversation segments to be aggregated into the event occurrence feedback report comprise the group-based communication conversation segments determined to be associated with one or more of an event occurrence identifier, an event occurrence timestamp, an event occurrence invitee identifier, an event occurrence invitation acceptance identifier, an event occurrence invitation decline identifier, or event occurrence attendee identifier, or an event occurrence title.

After the server 106 parses each group-based communication message of the plurality of group-based communication messages to detect one or more group-based communication conversation segments and aggregates the one or more group-based communication conversation segments into an event occurrence feedback report associated with the event occurrence identifier, at 310, the server 106 is configured to parse each group-based communication message of the plurality of group-based communication messages to detect one or more content creation occurrences. Each content creation occurrences may have a content topic associated therewith. The server 106 may be further configured to, upon determining that the content topic is related to the event occurrence title, aggregate content associated with the one or more content creation occurrences into the event occurrence feedback report. The content to be aggregated into the event occurrence feedback report may, in some embodiments, be retrieved from the group-based communication repository 107. In some embodiments, the content to be aggregated into the event occurrence feedback report comprises the content determined to be associated with one or more of an event occurrence identifier, an event occurrence timestamp, an event occurrence invitee identifier, an event occurrence invitation acceptance identifier, an event occurrence invitation decline identifier, an event occurrence attendee identifier, or an event occurrence title.

After the server 106 parses each group-based communication message of the plurality of group-based communication messages to detect one or more content creation occurrences and aggregates the one or more content creation occurrences into an event occurrence feedback report associated with the event occurrence identifier, at 312, the server 106 is configured to retrieve historical event occurrence attendance data associated with each of the event occurrence identifiers and, using an event occurrence attendance model, determine an event occurrence attendance score associated with the event occurrence identifier. The historical event occurrence attendance data may be retrieved from either or both of the third party event scheduling resource 103 or an internal database such as the group-based communication repository 107. In some embodiments, the event occurrence attendance model is based on one or more of a plurality of historical event occurrence attendance data, event occurrence data structures having one or more common event occurrence parameters, and events occurrences that have already concluded and are associated with common event occurrence creator identifiers. In some embodiments, the event occurrence attendance model comprises using a machine learning model that provides a prediction of a likelihood of an event occurrence invitee's attendance based on one or more of historical event occurrence attendance data, one or more common event occurrence parameters, and event occurrences that have already concluded and are associated with common event occurrence creator identifiers. In some embodiments, the event occurrence attendance model uses a machine learning model trained using historical event occurrence attendance data. In some embodiments, the event occurrence attendance score may be determined based a comparison of the historical event occurrence attendance data associated with each of the event occurrence invitee identifiers to predetermined benchmarks and suggested best practices associated with one or more common event occurrence parameters and events occurrences that have already concluded and are associated with common event occurrence creator identifiers, where the comparison defines relative overachievements and deficiencies of the historical event occurrence attendance data associated with each of the event occurrence invitee identifiers.

After the server 106 retrieves historical event occurrence attendance data associated with each of the event occurrence identifiers and determines an event occurrence attendance score associated with the event occurrence identifier, at 314, the server 106 is configured to aggregate the event occurrence attendance score into the event occurrence feedback report.

After the server 106 aggregates the event occurrence attendance score into the event occurrence feedback report, at 316, the server 106 is configured to transmit the event occurrence feedback report to a client device associated with an event occurrence creator identifier, where the event occurrence feedback report is renderable for display by the client device. In some embodiments, the event occurrence feedback report is renderable for display within a private group-based communication channel interface. In some embodiments, the event occurrence feedback report may comprise a compilation of one or more of the group-based conversation segments determined to be associated with a conversation topic related to the event occurrence title, the content determined to be associated with a content topic related to the event occurrence title, and the event occurrence attendance score consolidated into a single interface for presentation to a client device associated with an event occurrence creator. Further, in some embodiments, the event occurrence feedback report comprises at least the event occurrence timestamp, the event occurrence attendance score, the content associated with the one or more content creation occurrences, and the one or more group-based communication conversation segments. In some embodiments, the event occurrence feedback report may be rendered for display within an event occurrence feedback report interface.

In some embodiments, the server 106 may also be configured to store the event occurrence feedback report to the group-based communication repository 107.

Referring now to FIG. 4, an example embodiment for generating and presenting an event occurrence feedback report comprising historical event occurrence attendance data retrieved from a group-based communication repository 107 is provided.

At operation 411, a client device 102 is configured to send an event creation request to a third party event scheduling resource 103. The client device 102 may be associated with an event occurrence creator identifier. The third party event scheduling resource 103 may be configured to receive the event creation request and, at operation 412, send an event creation confirmation to the client device 102, which is configured to receive the event creation confirmation.

At operation 413, the third party event scheduling resource 103 is configured to send one or more event occurrence invites to a plurality of client devices 101. The plurality of client devices 101 may each be associated with an event occurrence invitee identifier. The plurality of client devices 101 may be configured to receive the one or more event occurrence invites and, at operation 414, send an event occurrence invitation acceptance or an event occurrence invitation decline to the third party event scheduling resource 103, which is configured to receive the respective event occurrence invitation acceptances and decline. Upon sending either an event occurrence invitation acceptance or an event occurrence invitation decline, one or more of the plurality of client devices may be associated with either an event occurrence invitation acceptance identifier or an event occurrence invitation decline identifier, respectively.

Upon completion of the event occurrence, at operation 415, the third party event scheduling resource 103 is configured to send an event occurrence data structure to a group-based communication server 106. In some embodiments, the event occurrence data structure may comprise a plurality of event occurrence parameters. In some embodiments, for example, the event occurrence parameters may comprise one or more of an event occurrence identifier, an event occurrence timestamp, the one or more event occurrence invitee identifiers, the one or more event occurrence invitation acceptance identifiers, the one or more event occurrence invitation decline identifiers, one or more event occurrence attendee identifiers, and an event occurrence title. The group-based communication server 106 may be configured to receive the event occurrence data structure.

At operation 416 the group-based communication server 106 may be configured to determine one or more group-based communication channel identifiers with which the event occurrence data structure is associated using a group-based communication system data corpus. Such a determination may be based on one or more of the event occurrence parameters. The group-based communication system data corpus may comprise group-based communication data work objects, group-based communication messages, group-based communication channels, and user profiles associated with a group-based communication system.

At operation 417, the plurality of client devices 101 may be configured to send a plurality of group-based messages associated with the one or more group-based communication channel identifiers to the group-based communication server 106. The group-based communication server 106 may be configured to receive the plurality of group-based messages associated with the one or more group-based communication channel identifiers. Each of the plurality of group-based communication messages may have associated therewith a group-based communication message timestamp occurring subsequent the event occurrence timestamp and may have a sending user identifier in common with one or more of the one or more event occurrence invitee identifiers, the one or more event occurrence invitation acceptance identifiers, the one or more event occurrence invitation decline identifiers, and the one or more event occurrence attendees identifiers.

At operation 418, the group-based communication server 106 is configured to detect one or more group-based communication segments associated with topics related to the event occurrence title. The group-based communication server 106 is configured to detect the one or more group-based communication segments by parsing each group-based communication message of the plurality of group-based communication messages. Each of the group-based communication segments may have a conversation topic associated therewith. In some embodiments, communication messages with the same conversation primitive identifier are grouped together to construct a conversation segment. A communication message may be parsed for various purposes, such as determining topics discussed in the communication message. For example, hashtags in the message may indicate topics associated with the message. In some embodiments, a communication message may be grouped into multiple conversation segments. In some embodiments, parsing each of the group-based communication messages into one or more communication message segments uses a machine learning model that has been trained using a group-based communication message corpus. In some embodiments, a group-based communication message may be parsed using a machine learning technique, such as topic modeling, to determine topics associated with the message.

At operation 419, the group-based communication server 106 is configured to detect content creation occurrences associated with a content topic related to the event occurrence title. The group-based communication server 106 is configured to detect the one or more content creation occurrences by parsing each group-based communication message of the plurality of group-based communication messages. Each of the content creation occurrences may have a content topic associated therewith. In some embodiments, parsing each of the group-based communication messages into one or more communication message segments uses a machine learning model that has been trained using a group-based communication message corpus.

At operation 420, the group-based communication server 106 is configured to, upon determining that one of either the group-based conversation segments or the content creation occurrences is associated with a conversation topic or content topic, respectively, related to the event title, aggregate the detected group-based communication segments and/or the content associated with the content creation occurrences into an event occurrence feedback report. In some embodiments, the group-based communication conversation segments to be aggregated into the event occurrence feedback report comprise the group-based communication conversation segments determined to be associated with one or more of an event occurrence identifier, an event occurrence timestamp, an event occurrence invitee identifier, an event occurrence invitation acceptance identifier, an event occurrence invitation decline identifier, or event occurrence attendee identifier, or an event occurrence title. The event occurrence feedback report may be associated with an event occurrence identifier. In some embodiments, the content to be aggregated into the event occurrence feedback report may also comprise the content determined to be associated with one or more of an event occurrence identifier, an event occurrence timestamp, an event occurrence invitee identifier, an event occurrence invitation acceptance identifier, an event occurrence invitation decline identifier, an event occurrence attendee identifier, or an event occurrence title.

At operation 421, the group-based communication repository 107 is configured to send historical event occurrence attendance data associated with one or more event occurrence invitee identifiers to the group-based communication server 106. In some embodiments, the historical event occurrence attendance data associated with an event occurrence invitee identifier may comprise an event occurrence invite status associated with the event occurrence invitee, event occurrence acceptance or decline, and event occurrence attendance. The group-based communication server 106 is configured to receive the historical event occurrence attendance data associated with each of the event occurrence invitee identifiers from the group-based communication repository 107. In other embodiments, the third party event scheduling resource 103 is configured to send historical event occurrence attendance data to the group-based communication server 106. In such a configuration, the group-based communication server 106 is configured to receive the historical event occurrence attendance data associated with each of the event occurrence invitee identifiers from the third party event scheduling resource 103.

At operation 422, the group-based communication server may be configured to determine an event occurrence attendance score using an event occurrence attendance model. The event occurrence attendance score may be associated with the one or more event occurrence identifiers. In some embodiments, the event occurrence attendance model is based on one or more of a plurality of historical event occurrence attendance data, event occurrence data structures having one or more common event occurrence parameters, and events occurrences that have already concluded and are associated with common event occurrence creator identifiers. In some embodiments, the event occurrence attendance model may comprise using a machine learning model that provides a prediction of a likelihood of an event occurrence invitee's attendance based on one or more of historical event occurrence attendance data, one or more common event occurrence parameters, and event occurrences that have already concluded and are associated with common event occurrence creator identifiers. The event occurrence attendance model may be a machine learning model trained using historical event occurrence attendance data. In some embodiments, the event occurrence attendance score is determined based a comparison of the historical event occurrence attendance data associated with each of the event occurrence invitee identifiers to predetermined benchmarks and suggested best practices associated with one or more common event occurrence parameters and events occurrences that have already concluded and are associated with common event occurrence creator identifiers, where the comparison defines relative overachievements and deficiencies of the historical event occurrence attendance data associated with each of the event occurrence invitee identifiers. Each of the overachievements or deficiencies of the historical event occurrence attendance data associated with each of the event occurrence invitee identifiers may be assigned a value and aggregated into the event occurrence attendance score.

At operation 423, the group-based communication server 106 is configured to aggregate the event occurrence attendance score associated with the one or more event occurrence identifiers into the event occurrence feedback report. The event occurrence feedback report may be associated with one or more of the event occurrence identifiers. In some embodiments, the event occurrence feedback report comprises at least the event occurrence timestamp, the event occurrence attendance score, the content associated with the one or more content creation occurrences, and the one or more group-based communication conversation segments determined to be associated with a conversation topic related to the event occurrence title.

At operation 424, the group-based communication server 106 is configured to render, for display, the event occurrence feedback report. In some embodiments, the event occurrence feedback report may be rendered for display within an event occurrence feedback report interface.

At operation 425, the group-based communication server 106 is configured to transmit the rendered event occurrence feedback report to a client device 102 associated with an event occurrence creator identifier. The client device 102 associated with the event occurrence creator identifier may be configured to receive the event occurrence feedback report from the group-based communication server.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor, perform a method for providing a feedback report following a meeting, the method comprising:
receiving, from a third party event scheduling resource, an event occurrence data structure associated with the meeting that indicates one or more group-based communication channels that are associated with the meeting and over which a plurality of messages associated with the meeting were communicated;
identifying a plurality of meeting elements associated with the meeting, the meeting comprising communication over the one or more group-based communication channels between two or more participants of a group-based communication system, wherein identifying the plurality of meeting elements comprises parsing the plurality of messages to identify one or more communication segments comprising at least a portion of the plurality of messages that are associated with a conversation topic, one or more content creation occurrences associated with the plurality of meeting elements, and a content creation topic associated with the one or more content creation occurrences, the one or more content creation occurrences being associated with electronic creation of content during the meeting, wherein identifying the plurality of meeting elements further comprises identifying that the conversation topic and the content creation topic correspond with a title of the meeting;
generating conversation primitive identifiers that are associated with the plurality of meeting elements;
indexing the plurality of meeting elements based at least in part on the conversation primitive identifiers;
retrieving information indicative of the plurality of meeting elements from the meeting based at least in part on the indexing;
generating the feedback report, wherein the feedback report comprises one or more meeting elements from the plurality of meeting elements;
storing the feedback report on a group-based communication repository, wherein the feedback report is accessible to at least one of the two or more participants or other users of the group-based communication system;
receiving a request to access the feedback report from a first participant of the two or more participants; and
causing display of the feedback report to the first participant within a channel of the group-based communication system that is associated with the meeting, wherein causing display of the feedback report comprises configuring, via one or more rendering instructions, a single event occurrence feedback report interface within the channel of the group-based communication system to display the one or more meeting elements.

2. The one or more non-transitory computer-readable media of claim 1, wherein the plurality of meeting elements comprises one or more video recordings, one or more conversation segments related to the meeting, and attendance data.

3. The one or more non-transitory computer-readable media of claim 2, wherein the plurality of meeting elements further comprises one or more files related to the meeting.

4. The one or more non-transitory computer-readable media of claim 3, wherein the plurality of meeting elements further comprises audio data from the meeting.

5. The one or more non-transitory computer-readable media of claim 2, wherein the attendance data comprises a join time, a leave time, and an attendance duration.

6. The one or more non-transitory computer-readable media of claim 5, wherein the attendance data further comprises a plurality of attendee identifiers corresponding to the two or more participants.

7. A method for providing a feedback report following a meeting, the method comprising:
receiving, from a third party event scheduling resource, an event occurrence data structure associated with the meeting that indicates one or more group-based communication channels that are associated with the meeting and over which a plurality of messages associated with the meeting were communicated;
identifying a plurality of meeting elements associated with the meeting, the meeting comprising communication over the one or more group-based communication channels between two or more participants of a group-based communication system, wherein identifying the plurality of meeting elements comprises parsing the plurality of messages to identify one or more communication segments comprising at least a portion of the plurality of messages that are associated with a conversation topic, one or more content creation occurrences associated with the plurality of meeting elements, and a content creation topic associated with the one or more content creation occurrences, the one or more content creation occurrences being associated with electronic creation of content during the meeting, wherein identifying the plurality of meeting elements further comprises identifying that the conversation topic and the content creation topic correspond with a title of the meeting;
generating conversation primitive identifiers that are associated with the plurality of meeting elements;
indexing the plurality of meeting elements based at least in part on the conversation primitive identifiers;
retrieving information indicative of the plurality of meeting elements from the meeting based at least in part on the indexing;
generating the feedback report, wherein the feedback report comprises one or more meeting elements from the plurality of meeting elements;
storing the feedback report on a group-based communication repository, wherein the feedback report is accessible to at least one of the two or more participants or other users of the group-based communication system;
receiving a request to access the feedback report from a first participant of the two or more participants; and
causing display of the feedback report to the first participant within a channel of the group-based communication system that is associated with the meeting, wherein causing display of the feedback report comprises configuring, via one or more rendering instructions, a single event occurrence feedback report interface within the channel of the group-based communication system to display the one or more meeting elements.

8. The method of claim 7, wherein the plurality of meeting elements comprises one or more video recordings, one or more conversation segments related to the meeting, and attendance data.

9. The method of claim 8, wherein the plurality of meeting elements further comprises one or more files related to the meeting.

10. The method of claim 9, wherein the plurality of meeting elements further comprises audio data from the meeting.

11. The method of claim 8, wherein the attendance data comprises a join time, a leave time, and an attendance duration.

12. The method of claim 11, wherein the attendance data further comprises a plurality of attendee identifiers corresponding to the two or more participants.

13. A system comprising:
at least one processor; and
one or more non-transitory computer-readable media storing computer-executable instructions that, when executed by the at least one processor, perform a method for providing a feedback report following a meeting, the method comprising:
receiving, from a third party event scheduling resource, an event occurrence data structure associated with the meeting that indicates one or more group-based communication channels that are associated with the meeting and over which a plurality of messages associated with the meeting were communicated;
identifying a plurality of meeting elements associated with the meeting, the meeting comprising communication over the one or more group-based communication channels between two or more participants of a group-based communication system, wherein identifying the plurality of meeting elements comprises parsing the plurality of messages to identify one or more communication segments comprising at least a portion of the plurality of messages that are associated with a conversation topic, one or more content creation occurrences associated with the plurality of meeting elements, and a content creation topic associated with the one or more content creation occurrences, the one or more content creation occurrences being associated with electronic creation of content during the meeting, wherein identifying the plurality of meeting elements further comprises identifying that the conversation topic and the content creation topic correspond with a title of the meeting;
generating conversation primitive identifiers that are associated with the plurality of meeting elements;
indexing the plurality of meeting elements based at least in part on the conversation primitive identifiers;
retrieving information indicative of the plurality of meeting elements from the meeting based at least in part on the indexing;
generating the feedback report, wherein the feedback report comprises one or more meeting elements from the plurality of meeting elements;
storing the feedback report on a group-based communication repository, wherein the feedback report is accessible to at least one of the two or more participants or other users of the group-based communication system;

receiving a request to access the feedback report from a first participant of the two or more participants; and causing display of the feedback report to the first participant within a channel of the group-based communication system that is associated with the meeting, wherein causing display of the feedback report comprises configuring, via one or more rendering instructions, a single event occurrence feedback report interface within the channel of the group-based communication system to display the one or more meeting elements.

14. The system of claim 13, wherein the plurality of meeting elements comprises one or more video recordings, one or more conversation segments related to the meeting, and attendance data.

15. The system of claim 14, wherein the plurality of meeting elements further comprises one or more files related to the meeting.

16. The system of claim 15, wherein the plurality of meeting elements further comprises audio data from the meeting.

17. The system of claim 14, wherein the attendance data comprises a join time, a leave time, and an attendance duration.

18. The system of claim 17, wherein the attendance data further comprises a plurality of attendee identifiers corresponding to the two or more participants.

19. The one or more non-transitory computer-readable media of claim 1, wherein the feedback report, including the one or more meeting elements, is displayed within a user interface associated with the group-based communication system.

20. The method of claim 7, wherein the feedback report, including the one or more meeting elements, is displayed within a user interface associated with the group-based communication system.

* * * * *